United States Patent Office 2,861,869
Patented Nov. 25, 1958

2,861,869

RECOVERY OF IRON, ALUMINUM, AND PHOSPHATE VALUES FROM PHOSPHOROUS MATERIALS

David H. Reeve, Chicago, Ill., assignor, by mesne assignments, to the United States of America as represented by the United States Atomic Energy Commission No Drawing. Application May 27, 1955
Serial No. 511,751

3 Claims. (Cl. 23—123)

This invention relates to the processing of phosphates. More particularly, it relates to the recovery of $P_2O_5$ values normally lost during the processing of phosphates to produce monocalcium and dicalcium phosphate. Still more particularly, it relates to the recovery of $P_2O_5$ values normally lost as aluminum phosphate and iron phosphate in precipitates produced during phosphorus-bearing solution purification.

In the manufacture of phosphates such as monocalcium phosphate and dicalcium phosphate, particularly where they are to be used as ingredients of animal feeds or further processed to manufacture chemicals of human food grade, the starting solution, for example, phosphoric acid or monocalcium phosphate solution must be purified by removal of fluorine, iron, aluminum and the like constituents.

Removal of the impurities is usually accomplished by adjusting the pH of the acidic phosphorus-bearing solution with a basic oxide-bearing reactant such as sodium and potassium salts, for example, soda ash, calcium compounds, for example, lime and limestone, the reactants being used singly or in various combinations. Upon adjusting the pH of the solution to a value in the range of about 2.5 to about 4.4, for example, using lime, a precipitate is formed which comprises some unreacted lime, calcium fluoride compounds, aluminum phosphate, iron phosphate, as well as some dicalcium phosphate.

This precipitate is generally of use only as a fertilizer material because of the high fluorine content.

It is a primary object of the instant invention to recover the constituents of aluminum phosphate and iron phosphate precipitates which have only low economic fertilizer or waste value in forms having greater economic value.

It is still another object of this invention to recover iron and aluminum from phosphatic salts in a useful oxide form.

These and other objects of the invention will be apparent from the following description.

Briefly, the invention comprises digesting a precipitate containing aluminum phosphate and iron phosphate with concentrated sulfuric acid, eliminating water when necessary, crystallizing iron and aluminum sulphates, separating the crystallized material from the predominantly sulfuric acid-phosphoric acid solution mixture and recovering the sulphate of the metallic salts for reuse in the process.

In a preferred embodiment of the invention, impure monocalcium phosphate solution is treated with lime or limestone in quantities sufficient to precipitate the impurities such as iron, aluminum, fluorine and the like. This precipitate is separated from the solution by, for example, filtration and is used for further processing either in a wet or dry form. Precipitate is digested with concentrated or aqueous acid solution. Wet precipitate carries with it anywhere from 20 to as much as 50% by weight of water. If wet precipitate is digested, its water content can be eliminated by adding oleum to the digest solution or by evaporation. If dry cake is digested with aqueous medium water must be decreased to the desired level by either of the methods suggested for handling digests of wet cakes. Digestion of dry cake with 98% sulfuric will eliminate need for dehydration. Digest solutions, if sufficiently concentrated, and preferably after heating crystallize iron and aluminum sulfate substantially completely. Digest solution generally is heated to a temperature in the range between about 150° C. and about 200° C. for a period of between about 20 minutes and about 90 minutes after sufficient dehydration. Any calcium present in the solution is thrown down as calcium sulphate. Iron and aluminum likewise are crystallized out as iron and aluminum sulphates. This crystallized material is separated by filtering or equivalent operation, leaving a solids-free solution containing predominantly sulfuric acid and phosphoric acid in a weight ratio between about 4:1 and about 2:1, preferably of the order of 3.5:1 with between about 90% and about 95% of the $P_2O_5$ recovered in solution.

Iron, calcium and aluminum sulphate crystals are calcined in suitable equipment such as a rotary kiln to decompose the iron and aluminum sulphate solids. Sulphur dioxide and sulphur trioxide gases evolved are suitably processed to convert them to sulfuric acid and oleum mediums for reuse in the process. The sulfuric acid-phosphoric acid mixture may be used in the preparation of monocalcium phosphate solution by reaction with phosphate rock and the phosphoric acid recovered as a calcium phosphate.

When digesting the aluminum and iron phosphate material quantities of sulfuric acid are utilized which vary according to the nature of the subsequent processing intended. If addition of oleum is contemplated, approximately stoichiometric reaction quantities based upon 98% sulfuric acid are utilized. If no addition of oleum is contemplated, then a minimum of about 150% of the stoichiometric equivalent amount of sulfuric acid for complete reaction is used. In general, it is preferred to operate the digestion in the presence of between about 40% and about 300% excess of sulfuric acid over the stoichiometric amount required for reaction in order to crystallize out the iron and aluminum sulfates. When using quantities of sulfuric acid which give approximately 1:1 weight ratio of sulphate to phosphate, crystals of iron and aluminum sulphate formed have a small particle size, are more difficult to handle, and contain sufficient phosphate to constitute appreciable phosphate losses. It is preferred to digest precipitates using quantities of sulfuric acid giving a weight ratio of sulphate to phosphate of about 2 to 1 or higher. Optimum crystallization conditions as measured by particle size and lack of phosphate contamination in the iron and aluminum sulphate is obtained when the digest is carried out by adding sulfuric acid in quantities to give a weight ratio of sulphate to phosphate in the range between about 2.6:1 and about 3:1.

When oleum is to be added, smaller quantities of sulfuric acid can be used initially, but acid concentration at the time of crystallizing iron and aluminum sulphates should be in the range between about 2:1 and about 9:1, preferably in the range between about 2.6:1 and about 3:1.

For desirable crystallization it is necessary that the solution obtained from the digestion be reduced in water content to less than about 8% by weight. Reduction may be accomplished by adding oleum or by removing water through a process step such as evaporation. In general, the quantity of water present will be dependent upon the water content of the precipitate being digested. It is preferred, therefore, but not necessary to the operability of the process that the cake be at least partially dried. Water is eliminated by evaporation. Temperatures for evaporation generally will be maintained in the range between about 150° C. and about 250° C.

Crystals of iron and aluminum sulphate will form in hot concentrated sulfuric acid solution at temperatures of the order of 192° C. Because of the difficulty in filtering or otherwise separating crystals from hot sulfuric acid solutions, the digest solutions generally are cooled. The temperature of filtration may be as low as room temperature, but in the interest of speed of processing the solutions generally are cooled to temperatures in the range between about 30° C. and about 100° C.

The recovered iron and aluminum sulphate crystal mixture is heat treated to convert the metallic sulfates to the oxide form. Iron sulphate when pure decomposes at about 480° C. Aluminum sulphate when pure decomposes at about 770° C. Variations in decomposition temperatures occur due to impurities. The complete decomposition operation may be carried out in one stage at a temperature in the range between about 800° C. and about 1400° C., preferably at a temperature between about 900° C. and about 1100° C. However, under certain conditions the decomposition may be carried out step-wise, heat treatment in the first stage being at temperatures between about 500° C. and about 750° C. In such a type operation, the partially decomposed material generally is leached to remove substantial quantities of aluminum sulphate which aluminum sulphate can then be recovered from the leached solution and independently decomposed at temperatures in the above mentioned range between about 800° C. and about 1400° C.

Sulfur dioxide and sulfur trioxide gases thrown off in the heat treatment of the iron and aluminum sulphate crystals may be recovered according to standard procedures currently in use in the manufacture of sulfuric acid.

The iron and aluminum phosphate starting material when precipitated from impure phosphate solutions such as are prepared from Florida phosphate rock contain fluorine and calcium compounds in addition to minor elements. The precipitate upon digestion with concentrated sulfuric acid will give off silicon tetrafluoride or hydrofluoric acid depending upon the quantities of silica and moisture present. If the precipitate is substantially free of silica and the moisture content of the digest is less than 10%, anhydrous hydrofluoric acid can be evolved.

The invention will be further understood from the following example which is given by way of explanation and without any intention that the invention be limited thereto.

*Example*

About 60 tons per hour of Florida phosphate rock are ground to a particle size approximately 52% of which pass through a 200 mesh standard screen. This rock analyzed about 68% bone phosphate of lime. The ground rock was mixed with about 36 tons per hour of 98% sulfuric acid added as approximately 53° Bé. aqueous solution. The mixture was thoroughly agitated for about one minute, after which it was discharged onto a continuous belt provided with exhaust means for gases such as sulfur dioxide, silicon tetrafluoride and the like adjacent the point of discharge of slurry onto a belt. The belt length and its speed were such that the mix remained on the belt approximately twenty minutes. The discharge from the belt was stored in a pile for about thirty days.

The stored material was then removed from storage, broken up, and sufficient water added to give a slurry of about 35% solids. The slurry was subjected to four stages of continuous countercurrent leaching and filtering, the final filtrate being a leached solution containing about 20% $P_2O_5$ content.

The filtrate from the leaching operation was further processed by adding approximately 4.7 tons per hour of limestone or its equivalent in calcium hydroxide added in the form of hydrated lime source material. After slurrying for approximately thirty minutes, the slurry was filtered on a drum filter to remove precipitated solids as well as any unreacted limestone. Dry filter cake from the defluorination step analyzed as follows:

| | Percent by weight |
|---|---|
| $P_2O_5$ | 31.3 |
| Fluorine | 8.0 |
| CaO | 40.0 |
| $Fe_2O_3$ | 7.6 |
| $Al_2O_3$ | 8.2 |
| Water | 2.0 |

1,000 parts by weight of dry solids of this filter cake was mixed with approximately 1,486 parts by weight of 96% sulfuric acid. The water content of the digest solution was approximately 8% by weight. The solution was then heated to approximately 192° C. and held at that temperature for approximately 1 hour, following which the solution was cooled to approximately 75° C. Crystals of iron and aluminum sulfate were removed from the digest liquor by filtering. The filtrate from this operation analyzed:

| | Percent by weight |
|---|---|
| CaO | .02 |
| $P_2O_5$ | 24.8 |
| $SO_4$ | 67.0 |
| $P_2O_5$ recovery | 89.0 |
| $Fe_2O_3$ | 0.1 |
| $Al_2O_3$ | 0.2 |
| F | 0.2 |

The filtered crystals analyzed as follows:

| | Percent by weight |
|---|---|
| $P_2O_5$ | 2.9 |
| $Al_2O_3$ | 7.2 |
| $Fe_2O_3$ | 6.5 |
| $SO_4$ | 65.7 |
| CaO | 34.3 |
| $H_2O$ | 2.0 |

The crystals were heat treated in a muffle furnace at a temperature of approximately 1000° C. for 1½ hours. The resultant solids analyzed as follows:

| | Percent by weight |
|---|---|
| $P_2O_5$ | 5.33 |
| $Al_2O_3$ | 13.7 |
| $Fe_2O_3$ | 12.5 |
| CaO | 46.6 |
| $SO_4$ | 45.6 |

Having thus described my invention, what is desired to be secured by Letters Patent is:

1. A method of recovering phosphorus components of iron and aluminum phosphates obtained by precipitation from acidic solutions containing the water soluble products of the reaction of strong acids with phosphorus-bearing material, which comprises digesting phosphate rock with aqueous solution of sulfuric acid, separating insoluble solids from aqueous solution of reaction products, adjusting the pH of said solution with a basic oxygen-bearing compound whereby predominantly iron and aluminum phosphate precipitates are formed, digesting the iron and aluminum precipitate with concentrated sulfuric acid solution, adjusting the sulfate to phosphate concentration to give a weight ratio of sulfate to phosphate in the range of between about 2:1 and about 9:1, reducing water to less than about 8% by weight whereby the solution is rendered supersaturated with respect to sulfate salts of iron and aluminum, heating said supersaturated solution upon initiation of metal sulfate crystallization to a temperature in the range between about 150° and about 250° C., crystallizing from the supersaturated solution the sulfate salts of iron and aluminum, separating the crystallized salts and recirculating the solids-free solution of sulfuric acid and phosphoric acid to the step wherein phosphate rock is treated with strong acid.

2. A method of recovering phosphorus components of iron and aluminum phosphates obtained by precipitation from acidic solutions containing the water soluble products of the reaction of sulfuric acid with phosphorus-bearing material, which comprises digesting phosphate rock with aqueous sulfuric acid, separating insoluble solids from the aqueous solution of reaction products, adjusting the pH of said solution with a basic oxygen-bearing compound whereby predominately iron and aluminum phosphate precipitates are formed, digesting the iron and aluminum phosphates with concentrated sulfuric acid solution, adjusting the sulfate to phosphate weight ratio in the range of between about 2:1 and about 9:1 to reduce the water content to less than about 8% by weight whereby the solution is rendered supersaturated with respect to iron sulfate and aluminum sulfate, heating the supersaturated solution upon initiation of metal sulfate crystallization to a temperature in the range between about 150° C. and about 250° C., crystallizing and separating the iron and aluminum sulfates from the supersaturated solution and recycling the solids-free solution of sulfuric and phosphoric acids to the phosphate rock-sulfuric acid digestion step.

3. A process as in claim 2 wherein the sulfate to phosphate weight ratio is adjusted to between about 2.6:1 and about 3:1 by adding oleum to the digested solution.

References Cited in the file of this patent

UNITED STATES PATENTS

| | | |
|---|---|---|
| 110,084 | Spence | Dec. 13, 1870 |
| 1,103,115 | Washburn | July 14, 1914 |
| 1,322,900 | Hart | Nov. 25, 1919 |
| 1,570,353 | Jacobsson | Jan. 19, 1926 |
| 2,467,271 | Peer | Apr. 12, 1949 |
| 2,551,944 | Haff | May 8 1951 |
| 2,600,813 | Tidwell | June 17, 1952 |
| 2,716,591 | Thomsen | Aug. 30, 1955 |